(12) United States Patent
Mukouhara et al.

(10) Patent No.: US 7,779,727 B2
(45) Date of Patent: Aug. 24, 2010

(54) POWER UNIT CASE CONFIGURED TO HOUSE BOTH AN ENGINE AND A TRANSMISSION, AND POWER UNIT INCLUDING SAME

(75) Inventors: Hodaka Mukouhara, Saitama (JP); Tensei Hayashi, Saitama (JP); Eiko Shiozaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 390 days.

(21) Appl. No.: 11/893,351

(22) Filed: Aug. 14, 2007

(65) Prior Publication Data

US 2008/0053271 A1    Mar. 6, 2008

(30) Foreign Application Priority Data

Aug. 30, 2006 (JP) ............................. 2006-234032

(51) Int. Cl.
| | |
|---|---|
| F16H 57/02 | (2006.01) |
| F16H 57/04 | (2010.01) |
| F16H 61/00 | (2006.01) |
| F01M 9/06 | (2006.01) |
| F01M 9/08 | (2006.01) |
| F16N 7/02 | (2006.01) |
| F16N 11/06 | (2006.01) |

(52) U.S. Cl. ........................ 74/606 R; 184/6.12; 184/65
(58) Field of Classification Search ............... 74/606 R; 184/1.5, 6.12, 65, 105.3
See application file for complete search history.

(56) References Cited

U.S. PATENT DOCUMENTS 2,762,233 A * 9/1956 Orr ................................ 184/6
7,055,487 B2 * 6/2006 Kawakubo et al. ...... 123/196 A
7,096,753 B2 * 8/2006 Kawakubo et al. ......... 74/337.5
7,198,021 B2 * 4/2007 Kawakubo et al. ....... 123/198 P
2003/0062800 A1    4/2003 Nagai

FOREIGN PATENT DOCUMENTS

| JP | 04-290662 | | 10/1992 |
|---|---|---|---|
| JP | 2001248715 A | * | 9/2001 |
| JP | 2002130443 A | * | 5/2002 |
| JP | 2002221273 A | * | 8/2002 |

OTHER PUBLICATIONS

Translation of JP2002130443A.*

* cited by examiner

*Primary Examiner*—Tisha D Lewis
(74) *Attorney, Agent, or Firm*—Carrier, Blackman & Associates, P.C.; William D. Blackman; Joseph P. Carrier

(57) ABSTRACT

A power unit case for a power unit, including an internal combustion engine and a transmission, makes it possible to enhance the lubrication of a desired meshing portion of a group of transmission gears, while reducing the size of the engine. In the power unit case, a main shaft is arranged above a space between a crankshaft and a counter shaft arranged at a position substantially horizontally behind the crankshaft. A gear-ratio selecting member is arranged above a group of transmission gears on the counter shaft whose upper portion rotates toward a meshing portion between groups of transmission gears, and a lubricating projection that projects downwardly is formed in the transmission case above each of the transmission gears on the counter shaft and at a location on a ceiling surface of the transmission case where the gear-ratio selecting member is supported.

17 Claims, 6 Drawing Sheets

US 7,779,727 B2

POWER UNIT CASE CONFIGURED TO HOUSE BOTH AN ENGINE AND A TRANSMISSION, AND POWER UNIT INCLUDING SAME

CROSS-REFERENCE TO RELATED APPLICATIONS

The present invention claims priority under 35 USC §119 based on Japanese patent application No. 2006-234032, filed on Aug. 30, 2006. The entire disclosure of this priority document, including specification, claims, and drawings is incorporated by reference herein.

BACKGROUND OF THE INVENTION

1. Technical Field of the Invention

The present invention relates to a power unit case for a power unit including an internal combustion engine and a transmission. In the power unit case, a crankcase and a transmission case are formed integrally together as a power unit case. The present invention also relates to a power unit incorporating an engine and a transmission within the described power unit case.

2. Background Art

With regard to internal combustion engines, used as a power source for vehicles, including a unitary case in which the rotation of a crankshaft in a crankcase is transmitted to the rotation of a main shaft in a transmission case via the meshing of primary gears, a combination of transmission gears for effectively transmitting power is selected and set from among a group of transmission gears on the main shaft and a group of transmission gears on the counter shaft, and the rotation of the main shaft is transmitted to the rotation of the counter shaft at a gear ratio of the set combination of transmission gears is generally known.

In addition, it is known to use a hollow lubricating-oil passage formed around the axial center of each of the main shaft and counter shaft where lubricating oil is ejected radially from oil holes formed at several locations of this lubricating-oil passage, thereby lubricating the group of transmission gears in the transmission chamber (see published patent document JP-2004-290662, for example).

In the case of the internal combustion engine as disclosed in published patent document JP-2004-290662, the unitary case that integrally forms the crankcase and the transmission case is formed so as to be divided into an upper case and a lower case, with the crankshaft, the main shaft, and the counter shaft arranged in the parting surface of the unitary case. Ribs that obliquely cross each other are formed in the inner surface above the transmission chamber of the upper case, and the intersection of the ribs is positioned directly above a predetermined meshing portion of transmission gears, so that lubricating oil thrown upward by the rotation of the group of transmission gears adheres onto the inner surface above the transmission chamber of the upper case, and the lubricating oil that has flown along the inner surface is dripped to the predetermined meshing portion of transmission gears from the intersection of the ribs, thereby effecting lubrication.

The unitary case of the internal combustion engine disclosed in published patent document JP-2004-290662 has a structure with a long front-to-rear width in which the crankshaft, the main shaft, and the counter shaft are arranged side by side in the front-to-rear direction in this order in the parting surface between the upper and lower unitary case halves. Although the arrangement of the main shaft and the counter shaft side by side in the front-to-rear direction allows lubricating oil to be dripped to the meshing portion of transmission gears from above, the front-to-rear width of the unitary case becomes large, resulting in an increase in the size of the internal combustion engine.

SUMMARY OF THE INVENTION

The present invention has been made in view of the above-mentioned problem, and accordingly it is an object of the present invention to provide a power unit case for an internal combustion engine, which makes it possible to enhance the lubrication of a desired meshing portion of a group of transmission gears, while reducing the size of an internal combustion engine.

In order to attain the above-mentioned object, a power unit case is provided for an internal combustion engine according to a selected embodiment of the present invention, including a unitary case having a crankcase in which a crank mechanism is accommodated, and a transmission case in which a transmission mechanism is accommodated integrally formed therein. In the power unit case according to the selected embodiment, the transmission mechanism includes a main shaft to which power is transmitted through meshing of a gear with a crankshaft, a counter shaft to which power is transmitted through mutual meshing of a group of transmission gears with the main shaft, and gear-ratio selecting mechanism for selecting a combination of transmission gears for performing effective power transmission from among the group of transmission gears. The main shaft is arranged above a space between the crankshaft and the counter shaft arranged at a position substantially horizontally in back of the crankshaft. The gear-ratio selecting mechanism is arranged above the group of transmission gears on the counter shaft whose upper portion rotates toward a meshing portion of the group of transmission gears. A lubricating projection that projects downward is formed above the transmission gears on the counter shaft and at a location on a ceiling surface inside the transmission case where the gear-ratio selecting mechanism is supported.

A second aspect of the invention provides a lubricating projection formed above a combination of transmission gears on the counter shaft which provides a large gear ratio, in the power unit case for an internal combustion engine hereof A further aspect of the invention provides a rib, that is oriented in an axial direction, formed so as to project downwardly, at a location on the ceiling surface inside the transmission case which displaced rearwardly from a position vertically above the main shaft. The gear-ratio selecting mechanism may be a shift fork shaft.

Another aspect of the invention is that the main shaft is arranged above the space between the crankshaft and the counter shaft at a position substantially horizontally behind the crankshaft, and the respective axes of the crankshaft, the main shaft, and the counter shaft are positioned at the corners of an acute-angled triangle, thereby reducing the size of the internal combustion engine by a reduction in the front-to-rear width of the unitary case. The gear-ratio selecting mechanism is arranged above the group of transmission gears on the counter shaft whose upper portion rotates toward the meshing portion of the group of transmission gears, and the lubricating projection that projects downward is formed above the transmission gears on the counter shaft and at a location on a ceiling surface inside the transmission case where the gear-ratio selecting mechanism is supported. Accordingly, the lubricating oil that has been thrown upward by the rotation of the group of transmission gears and the like and has adhered onto the ceiling surface of the transmission case travels along the ceiling surface to flow to the lubricating projection, and is then dripped onto the upper portions of the transmission gears on the counter shaft from the lubricating projection and supplied to the meshing portion of the transmission gears as the transmission gears rotate, thereby making it possible to enhance the lubrication of the meshing portion between the transmission gears.

In the above-described embodiment, the lubricating projection is formed above a combination of transmission gears on the counter shaft which provides a large gear ratio. This provides positive lubrication to the meshing portion of the transmission gears on which a large load acts, enhancing lubrication performance.

An additional aspect of the invention provides a rib that is oriented in an axial direction formed so as to project downwardly, at a location on the ceiling surface inside the transmission case which is displaced rearwardly from a position vertically above the main shaft. Accordingly, the lubricating oil that has been thrown upward by the rotation of the group of gears on the main shaft is temporarily received by the rib, and is dripped onto the group of transmission gears and supplied to the meshing portion between groups of transmission gears. Further, the lubricating oil that has scattered off and adhered onto the ceiling surface due to the centrifugal force of the rotation of the groups of transmission gears is collected to the lubricating projection and dripped onto the transmission gears, thereby enabling efficient lubrication of both the groups of transmission gears that are meshing with each other in multiple stages.

Another aspect of the invention is that the gear-ratio selecting mechanism is a shift fork shaft that is positioned close to the mutually meshing groups of transmission gears of both the main shaft and the counter shaft. Therefore, the lubricating projection, at a location on the ceiling surface of the transmission case where the shift fork shaft, is supported in a position close to the group of transmission gears on the counter shaft, thereby enabling efficient supply of lubricating oil to the transmission gears.

For a more complete understanding of the present invention, the reader is referred to the following detailed description, which should be read in conjunction with the accompanying drawings. Throughout the detailed description and in the drawings, like numbers refer to like parts.

The present invention is not limited to its application to the details of construction and to the dispositions of the components set forth in the following description or illustrated in the drawings. It is to be understood that the phraseology and terminology employed herein are for the purposes of illustration and example, and should not be regarded as limiting.

As such, those skilled in the art will appreciate that the concept upon which this disclosure is based, may readily be utilized as a basis for the designing of other structures, methods and systems for carrying out the several purposes of the present invention. It is important, therefore, that the claims be regarded as including such equivalent constructions.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

An internal combustion engine E according to this embodiment is a four-cylinder, water-cooled four-stroke internal combustion engine in which the four cylinders are arranged in an in-line series. The internal combustion engine E is horizontally mounted in a motorcycle with a crankshaft 10 oriented in the left-to-right direction with respect to the advance direction of the vehicle.

It should be noted that in this specification, relative positional terms such as front, rear, left and right are considered from a vantage point of a driver seated on the motorcycle and facing forward, or the orientation of the engine components on the engine as they would be situated when mounted on a motorcycle, considered from the driver's vantage point.

Figure 1:
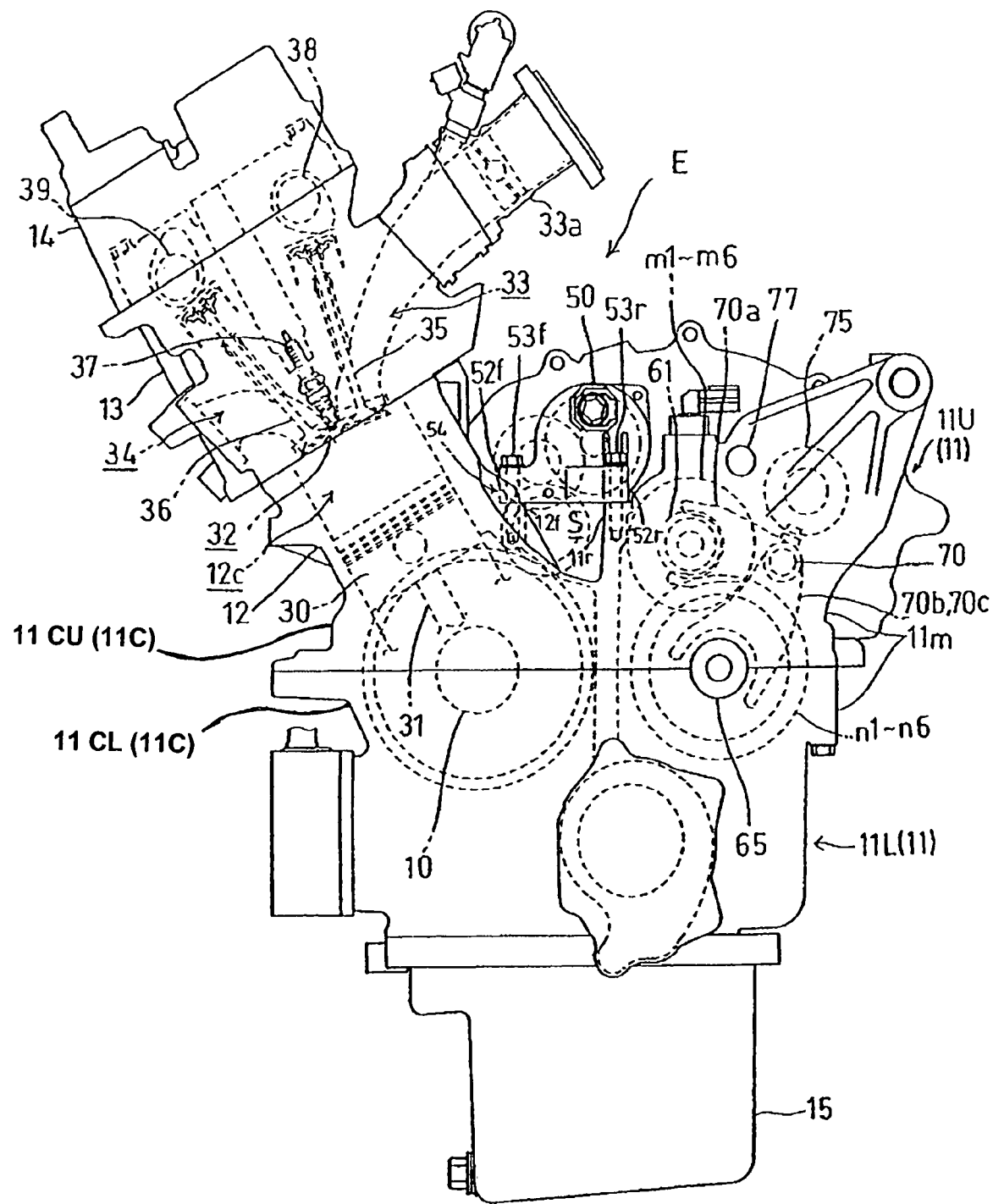
FIG. 1 is a left view of an internal combustion engine according to a selected illustrative embodiment of the present invention.

A left view of the internal combustion engine E is shown in FIG. 1. In the internal combustion engine E, a crankcase 11c that forms a crank chamber C for accommodating the crankshaft 10, and a transmission case 11m that forms a transmission chamber M for accommodating a transmission mechanism 60 are integrally formed in the front-to-rear direction to constitute a unitary case 11.

The unitary case 11 itself is formed so as to be divided into an upper unitary case 11U and a lower unitary case 11L.

A cylinder block portion 12, molded integrally to define four serially arranged cylinder bores 12c therein, is formed so as to extend upwardly on the upper case 11L, while being somewhat forwardly inclined. A cylinder head 13 is laid on top of the cylinder block portion 12, and a cylinder head cover 14 is disposed on top of the cylinder head 13. An oil sump 15 is mounted below the lower unitary case 11L.

A piston 30 is fitted in each of the cylinder bores 12c of the cylinder block portion 12 so as to be capable of reciprocating sliding motion. Each piston 30 is connected to the crankshaft 10 via a respective connecting rod 31.

A spark plug 37, with a tip end thereof facing the combustion chamber 32, is inserted in the cylinder head 13 for each of the cylinder bores 12c. A combustion chamber 32 is formed in the cylinder head 13 so as to be opposed to the piston 30, and an intake port 33, which is open to the combustion chamber 32 and opened and closed by a pair of intake valves 35, extends rearwardly, while an exhaust port 34 opened and closed by a pair of exhaust valves 36 extends forwardly from the combustion chamber.

It should be noted that a throttle body 33a is connected to an upstream intake passage pipe of the intake port 33 and, although not shown, an intake pipe is connected to the upstream side of the throttle body. An exhaust pipe (not shown) is connected to a downstream opening of the exhaust port 34.

Each of the intake valves 35 and each of the exhaust valves 36 are driven so as to open and close by an intake camshaft 38 and an exhaust camshaft 39, which are rotatably journaled to the cylinder head 13, in synchronism with the rotation of the crankshaft 10.

For this reason, cam sprockets 38s, 39s are fitted into the right end portions of the respective cam shafts 38, 39. A timing chain 40 is wound between a drive sprocket 10s, which is fitted into a portion near the right end portion of the crankshaft 10, and each of the cam sprockets 38s, 39s (see FIG. 2), and is rotationally driven at some fraction of the rotational speed of the crankshaft 10.

Figure 2:
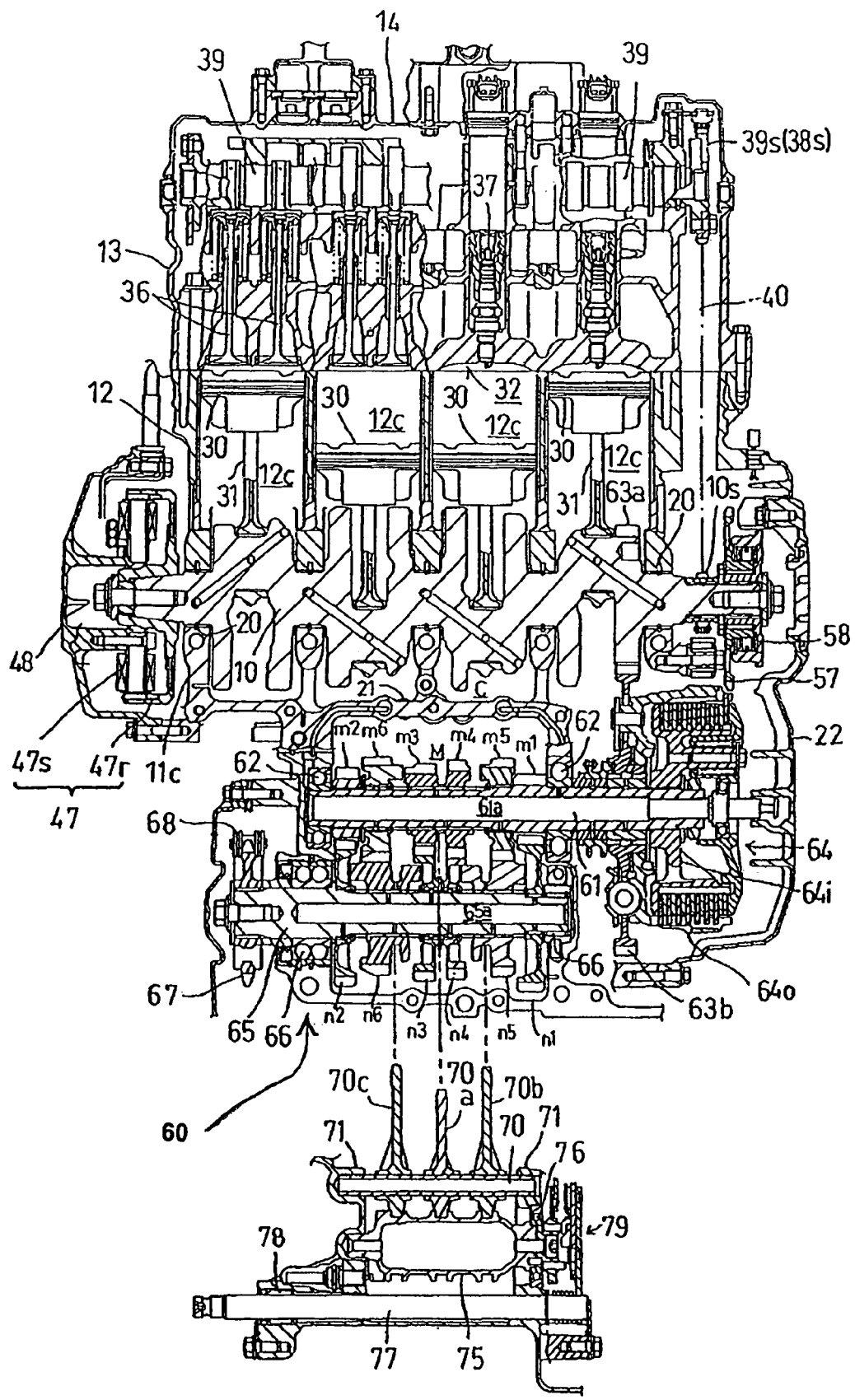
FIG. 2 is an exploded sectional view of the internal combustion engine of FIG. 1.

The crankshaft 10 is rotatably journaled while being sandwiched between the upper and lower crankcases 11cu, 11cl via a main bearing 20. As shown in FIG. 2, in the right portion of the crankshaft 10, a starter driven gear 57 is journaled via a one-way clutch 58 to an end portion located on the further right side with respect to the driven sprocket 10s fitted as described above.

As shown in FIG. 2, an outer rotor 47r of an AC generator 47 is fitted into the left end portion of the crankshaft 10 extending through the left wall of the crankcase 11c. An inner stator 47s of the AC generator 47 which includes a generator coil is arranged inside the outer rotor 47r while being supported on a generator cover 48 that is covered to the AC generator 47 from the left.

The transmission chamber M, which is formed on the rear side in the transmission case 11m (see FIG. 2 and FIG. 6), is partitioned off by the crank chamber C of the crankcase 11c accommodating the crankshaft 10, and a partition wall 21.

The transmission mechanism 60 accommodated in the transmission chamber M is a constant-mesh gear transmission. At a position rear of and obliquely above the crankshaft 10, a main shaft 61 is rotatably journaled via bearings 62 to left and right bearing portions 62a of the upper transmission case 11m, and at a position behind the crankshaft 10, a counter shaft 65 is rotatably journaled via bearings 66 while being sandwiched between semi-arcuate bearing portions 66a formed in the parting surface between the upper- and lower transmission cases 11m.

The main shaft 61 is arranged above the space between the crankshaft 10 and the counter shaft 65 arranged at a position substantially horizontally behind the crankshaft 10. The crankshaft 10, the main shaft 61, and the counter shaft 65 are disposed parallel to each other, while being oriented in the left-to-right, horizontal direction. As seen in side view, FIG. 1, these shafts are positioned at the corners of an acute-angled triangle and compactly brought together, thereby reducing the size of the unitary case 11.

Six transmission gears m1 to m6 with gear ratios ranging from first to sixth are journaled to the main shaft 61 inside the transmission chamber M. Transmission gears n1 to n6 corresponding to the transmission gears m1 to m6 are journaled to the counter shaft 65, and the corresponding transmission gear pairs are in mesh with each other.

Referring to FIG. 2, the meshing between gears with the largest gear ratio, the first-speed gears m1, n1, is positioned on the rightmost side along the right wall of the transmission chamber M, the meshing between the second-speed gears m2, n2 is positioned on the leftmost side along the left wall of the transmission chamber M, and the meshing between the third-speed gears m3, n3, between the fourth-speed gears m4, n4, between the fifth-speed gears m5, n5, and between the sixth-speed gears m6, n6 are positioned between the first-speed gears m1, n1, and the second-speed gears m2, n2.

Of these, the third-speed gear m3 and the fourth-speed gear m4 on the main shaft 61 are integrally spline-fitted to the main shaft 61 and act as a shifter to move axially so as to be capable of selectively engaging with or disengaging from the sixth-speed gear m6 and the fifth-speed gear m5 on the left and right, and the fifth-speed gear n5 and the sixth-speed gear n6 on the counter shaft 65 are integrally spline-fitted to the counter shaft 65 and act as a shifter to move axially so as to be capable of selectively engaging with or disengaging from the transmission gears on the left and right of the fifth-speed gear n5 and the sixth-speed gear n6.

The integrated structures of the third-speed gear m3 and the fourth-speed gear m4 on the main shaft 61, and the fifth-speed gear n5 and the six-speed gear n6 on the counter shaft 65, which each serve as a shifter, are moved by a gear shift operation mechanism to effect a gear shift.

Figure 5:
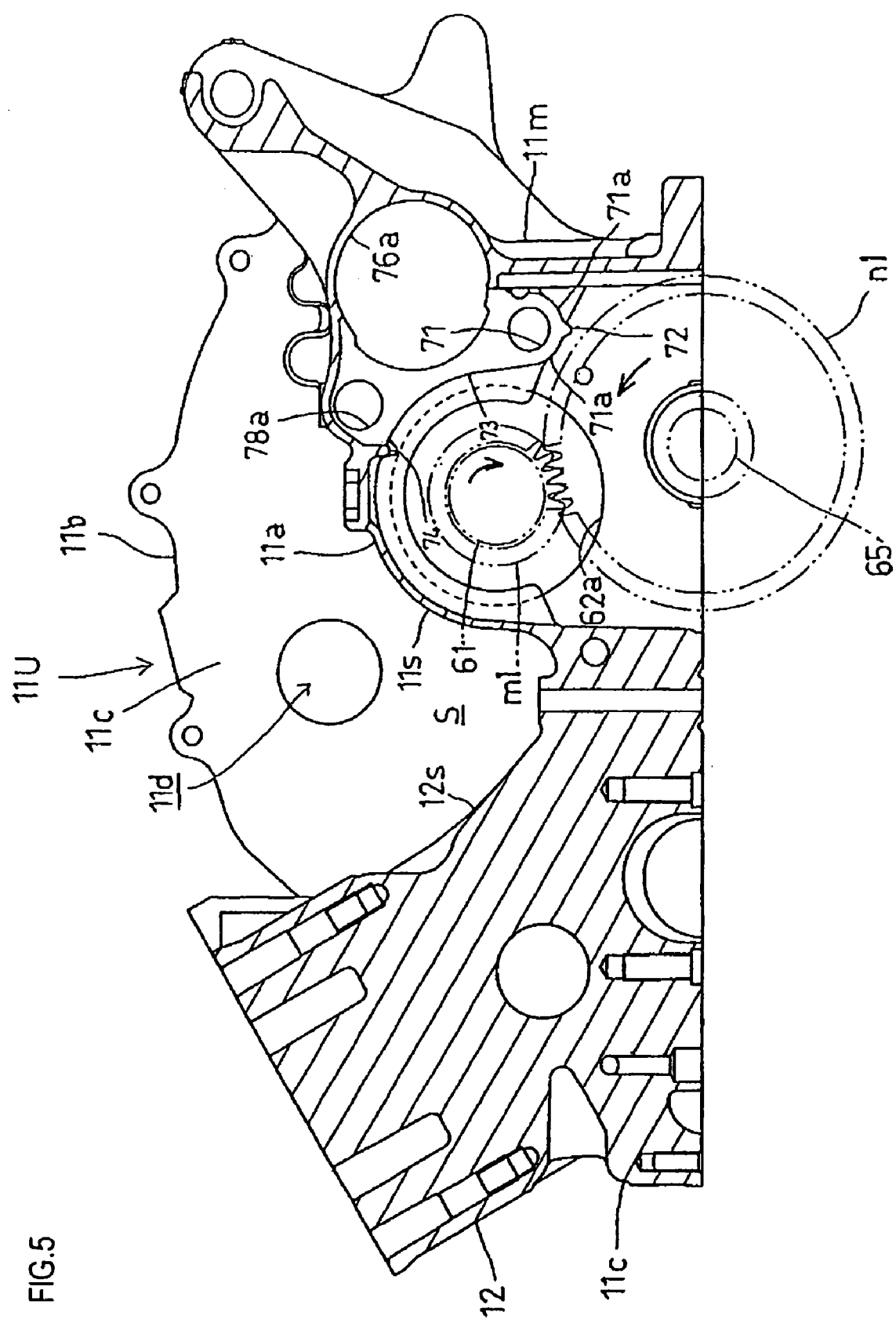
FIG. 5 is a cross-sectional view taken along the line V-V of FIG. 3.

Referring to FIGS. 1 and 5, in the gear shift operation mechanism, a shift fork shaft 70 is supported rear of the main shaft 61 with its both ends fitted into left and right bearing portions 71 of the upper transmission case 11m. Above the shift fork shaft 70, a shift drum 75 is rotatably journaled to left and right bearing portions 76a of the upper transmission case 11m via bearings 76.

Further, at a position in front of and slightly obliquely above the shift drum 75, a shift spindle 77 is rotatably journaled to left and right bearing portions 78a of the upper transmission case 11m via a bearing 78.

Referring to FIG. 2, respective shift pins of shift forks 70a, 70b, 70c slidably supported on the shift fork shaft 70 are fitted in three shift grooves formed in the outer peripheral surface of the shift drum 75. As the shift drum 75 turns, the shift fork 70a, which moves axially while being guided along the shift groove, causes the third-speed gear m3 and the fourth-speed gear m4 on the main shaft 61 to move, and the shift forks 70b, 70c respectively cause the fifth-speed gear n5 and the sixth-speed gear n6 on the counter shaft 65 to move, thereby effectively changing the transmission gear pair that transmits power.

The shift drum 75 turns as the rotation of the shift spindle 77 by a required angle is transmitted via a link mechanism 79.

A multiple-disc friction clutch 64 is provided to the right end portion of the main shaft 61 projecting from the transmission chamber M. A primary driven gear 63b, which is supported on a large-diameter clutch outer 64o of the friction clutch 64 so as to rotate therewith, and a primary drive gear 63a formed in a crank web located on the rightmost side of the crankshaft 10 are brought into meshing engagement with each other, thereby forming a primary speed-reduction mechanism.

A clutch inner 64i located on the output side of the friction clutch 64 is spline-fitted to the main shaft 61. The rotation of the crankshaft 10 is thus transmitted to the main shaft 61 via the primary speed-reduction mechanism 63a, 63b and the friction clutch 64.

A right case cover 22 is placed so as to cover the large-diameter friction clutch 64 at the right end of the main shaft 61, and the one-way clutch 58 at the right end of the crankshaft 10, from the right side.

The rotation of the main shaft 61 is transmitted to the counter shaft 65 through the meshing engagement between the transmission gears m1 through m6 and the transmission gears n1 through n6.

The counter shaft 65 also serves as an output shaft, and an output sprocket 67 is fitted into a left end portion of the counter shaft 65 which extends through the unitary case 11 to project outward. Power is transmitted to the rear wheel via the secondary speed-reduction mechanism which is formed by a driving chain 68 wound between the output sprocket 67 and a driven sprocket (not shown) of a rear wheel.

Since the transmission mechanism 60 and the large-diameter friction clutch 64 are constructed as described above, in the upper unitary case 11U that covers these components from above, an upper wall of the rear transmission case 11m is raised upward so as to cover the transmission gears m1 to m6 journaled to the main shaft 61, and the shift drum 75, forming a raised portion 11a (see FIG. 5).

Accordingly, as shown in FIG. 5, a rear inclined surface 12s of the cylinder block portion 12 that is tilted forward, and a front wall surface 11s of the raised portion 11a are disposed of in a substantially V-shaped formation.

Further, the right side of the upper unitary case 11U forms an enlarged portion 11b that largely juts out upward and has a left wall 11c so as to accommodate a starting speed-reduction gear mechanism 54 for transmitting the drives by the large-diameter friction clutch 64 and a starter motor 50 that will be described later. The right side of the enlarged portion 11b is covered by the right case cover 22 as shown in FIG. 2.

Figure 6:
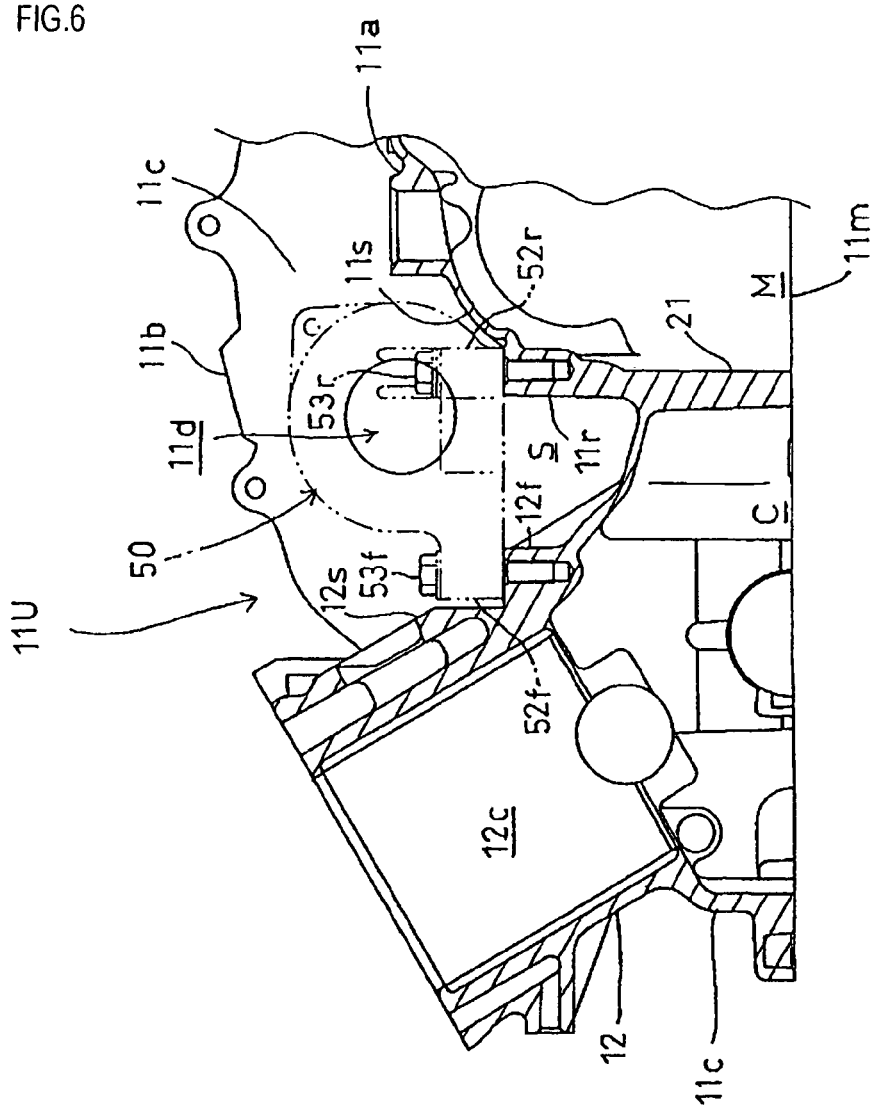
FIG. 6 is a cross-sectional view taken along the line VI-VI of FIG. 3.

As shown in FIGS. 5 and 6, on the left side of the left wall 11c of the enlarged portion 11b that is on the right side of the upper unitary case 11U, the starter motor 50 is disposed in a V-shaped space S formed in the front-to-rear direction by the rear inclined surface 12s of the cylinder block portion 12 and the front wall surface 11s of the raised portion 11a.

A circular hole 11d, into which a drive shaft 50a of the starter motor 50 is inserted, is bored in the left wall 11c of the enlarged portion 11b. A front mounting boss 12f is formed in the rear inclined surface 12s of the cylinder block portion 12. A rear mounting boss 11r is formed in the front wall surface 11s of the raised portion 11a.

Figure 3:
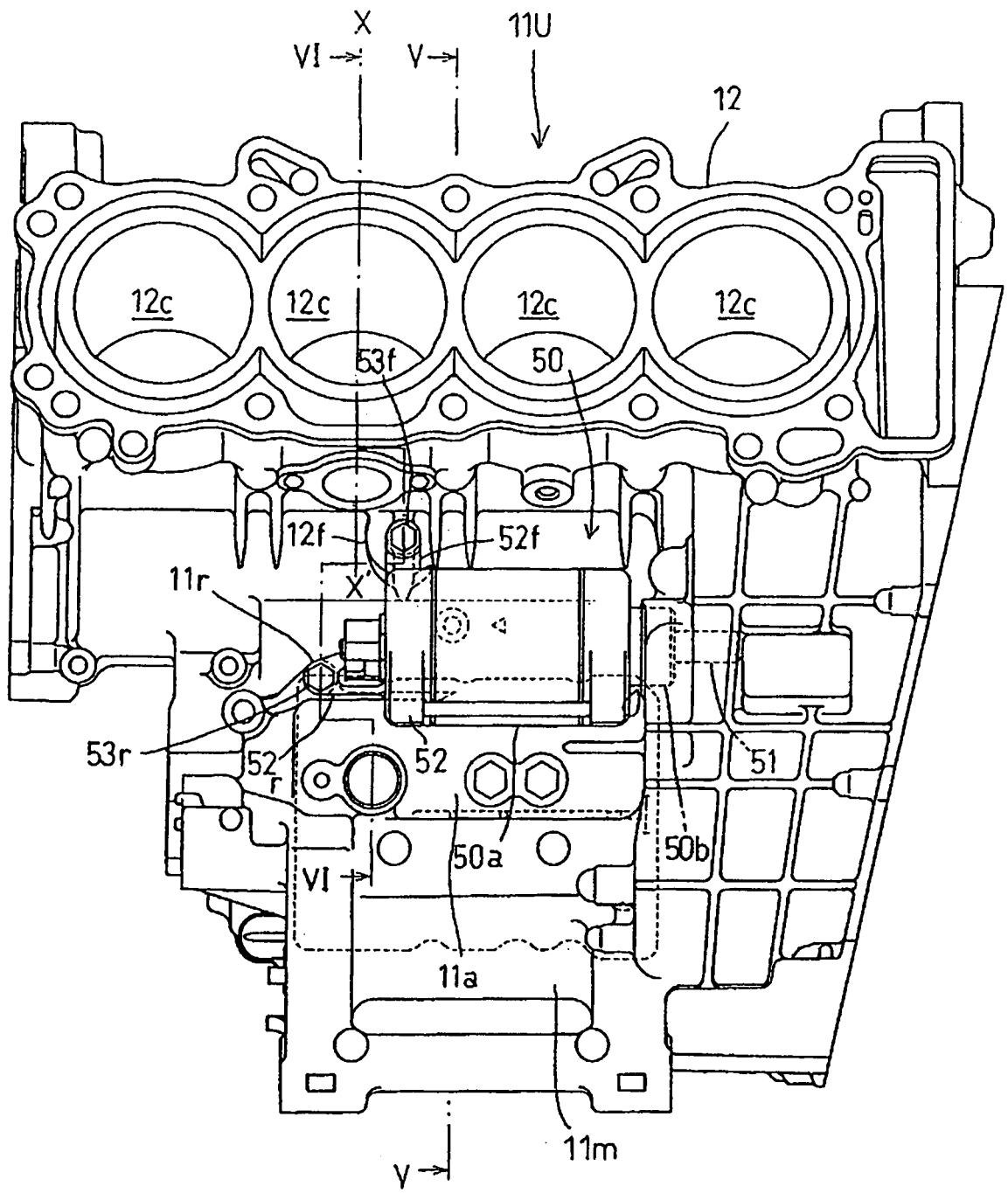
FIG. 3 is a top view of an upper unitary case.

Referring to FIG. 3, the front mounting boss 12f is formed in the rear inclined surface 12s behind the cylinder bore 12c that is located second from the left from among the four cylinder bores 12c arranged in series in the left-to-right direction, and at a position that is offset to the right side in the crankshaft direction from the cylinder center axis X-X' of the cylinder bore 12c located second from the left. The rear mounting boss 11r is formed in the front wall surface 11s of the raised portion 11a, and on the left side in the crankshaft direction with respect to the cylinder center axis X-X' of the above-mentioned cylinder bore 12c located second from the left. Accordingly, the front mounting boss 12f and the rear mounting boss 11r are offset from each other in the crankshaft direction.

Further, as shown in FIGS. 1 and 6, the mounting seat surface of the front mounting boss 12f and the mounting seat surface of the rear mounting boss 11r are located at the same height as the parting surface of the unitary case 11.

The starter motor 50 is mounted to the front mounting boss 12f and the rear mounting boss 11r. The starter motor 50 has its substantially cylindrical main body portion 50a placed on the upper unitary case 11U as shown in FIG. 3. A bearing cylinder portion 50b projects from the right end face of the main body portion 50a, and a motor drive shaft 51 projects from the bearing cylinder portion 50b (see FIG. 7).

Figure 7:
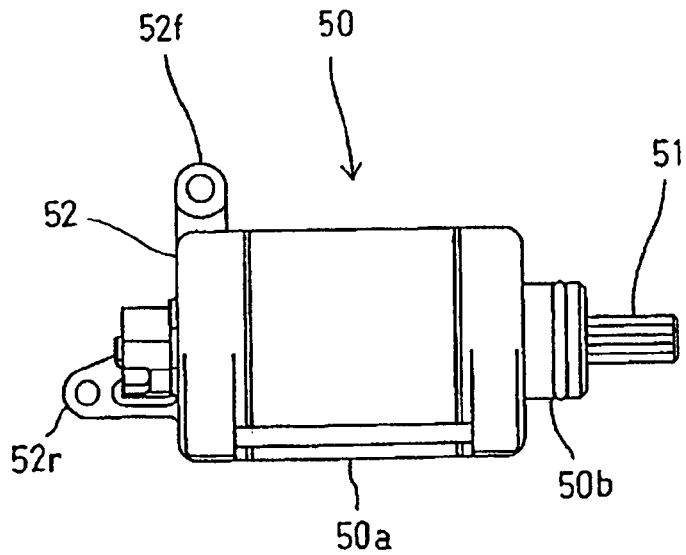
FIG. 7 is a top view of a starter motor.

As shown in FIGS. 3 and 7 a mounting member 52 is fitted onto the left end portion of the main body portion 50a. A front bracket 52f extends forward from the lower front portion of the mounting member 52, and a rear bracket 52r extends to the left from the lower rear portion thereof In the V-shaped space S located on the left side of the left wall 11c of the enlarged portion 11b on the right side of the upper unitary case 11U and formed by the rear inclined surface 12s of the cylinder block portion 12 and the front wall surface 11s of the raised portion 11a, the motor drive shaft 51, of the starter motor 50, is inserted through the circular hole 11d bored in the left wall 11c, thereby fitting the bearing cylinder portion 50b, which projects from the right end face of the main body, in the circular hole 11d. The forwardly extending front bracket 52f of the mounting member 52 at the left end of the main body is placed on the mounting seat of the front mounting boss 12f and fastened with a bolt 53f, and the rear bracket 52r that extends to the left is placed on the mounting seat of the rear mounting boss 11r and fastened with a bolt 53r. The starter motor 50 is thus mounted onto the upper unitary case 11U as shown in FIG. 3.

Accordingly, the starter motor 50 is mounted so as to be suspended in the V-shaped space S formed by the rear inclined surface 12s of the cylinder block portion 12 and the front wall surface 11s of the raised portion 11a, with the bearing cylinder portion 50b at the right end of the starter motor 50 fitted in the circular hole 11d of the left wall 11c of the enlarged portion 11b, and with the mounting member 52 at the left end of the starter motor 50 fastened to the front mounting boss 12f and the rear mounting boss 11r.

The motor drive shaft 51 of the starter motor 50 is inserted in the circular hole 11d of the left wall 11c of the enlarged portion 11b, and a drive gear formed at the distal end portion of the motor drive shaft 51 is gear-coupled to the starter driven gear 57 of the crankshaft 10 via the starting speed-reduction gear mechanism 54.

The internal combustion engine E is started through forcible rotation of the crankshaft, when the starter motor 50 is driven and the motor drive shaft 51 rotates, the rotation is transmitted to the starter driven gear 57 via the starting speed-reduction gear mechanism 54, and the rotation of the starter driven gear 57 is transmitted to the crankshaft 10 via the one-way clutch 58.

Figure 4:
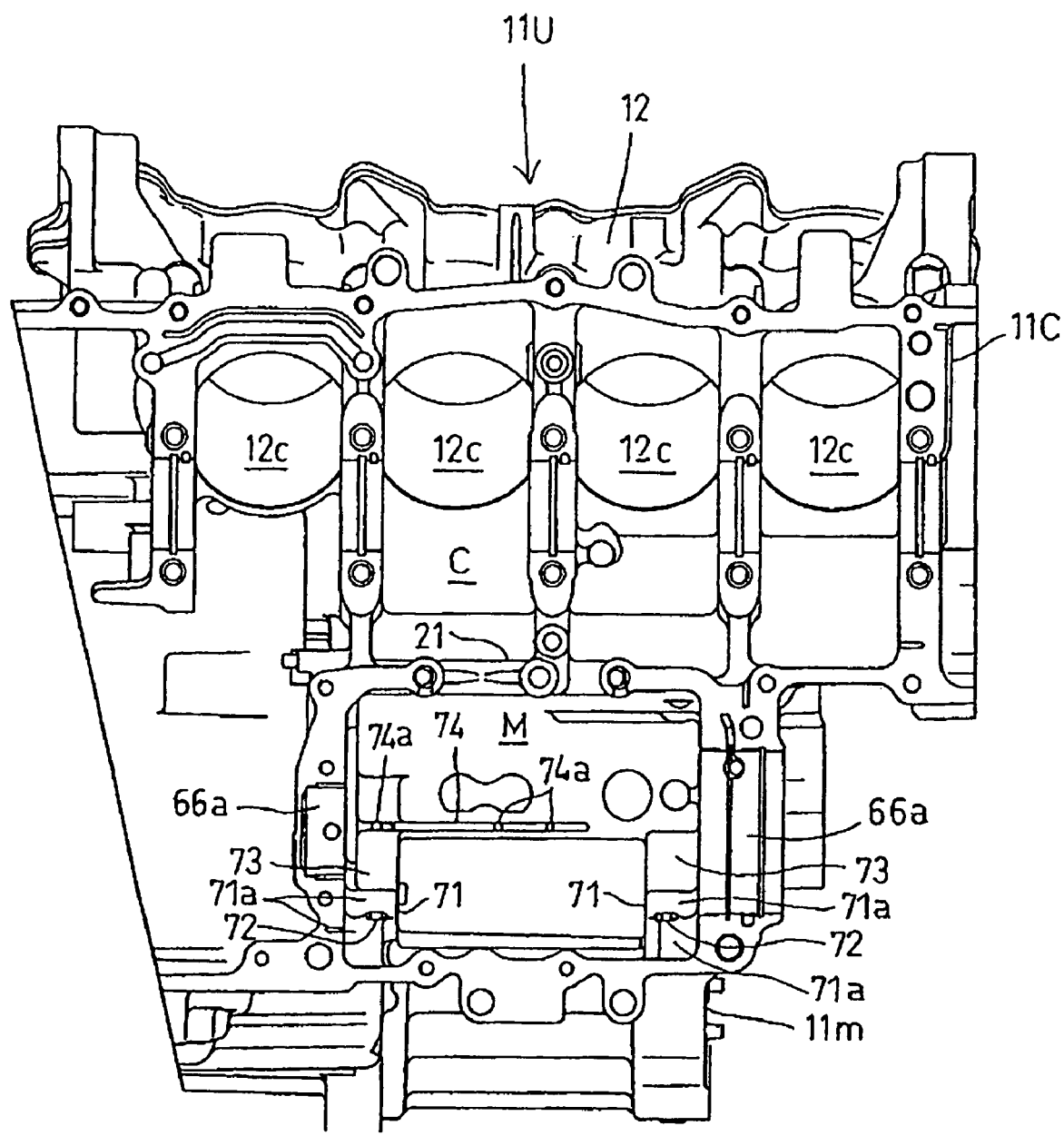
FIG. 4 is a bottom view of the upper unitary case.

Referring to FIGS. 4 and 5, in the internal combustion engine E as described above, in the inner surface of the raised portion 11a of the transmission case 11m of the upper unitary case 11U, that is, in the ceiling surface of the transmission chamber M, lubricating projections 72 are formed so as to project downwardly from the left and right bearing portions 71 into which the right end of the shift fork shaft 70 is fitted and supported. The lubricating projection 72 on the right side is formed above the first-speed gear n1 on the rightmost side which is journaled to the counter shaft 65 inside the transmission chamber M.

As shown in FIG. 5, the right bearing portion 71 of the shift fork shaft 70 is located at the downwardly-hanging lower end portion on the rear side of an arcuate ceiling surface 73 along the first-speed gear m1 on the rightmost side which is journaled to the main shaft 61. The lower surface of the right bearing portion 71 at the lower end portion forms an arcuate surface 71a, and the lowermost portion of the arcuate surface 71a projects further downward to form the lubricating projection 72.

In the right bearing portion 71 of the shift fork shaft 70, the front side of the lubricating projection 72 forms a front-half arcuate surface 71a that is continuous to the arcuate ceiling surface 73. Likewise, the rear side of the lubricating projection 72 forms a rear-half arcuate surface 71a.

The left bearing portion 71 of the shift fork shaft 70 is shaped similarly. The left lubricating projection 72 is similarly formed so as to project downwardly from the left bearing portion 71.

Referring to FIGS. 4 and 5, in the ceiling surface of the transmission chamber M, a rib 74 is formed so as to project downwardly while being oriented in the axial direction (left-to-right direction), at a position that is slightly displaced rearwardly from a location vertically above the main shaft 61.

The rib 74 is formed above the transmission gears m1 through m6 journaled to the main shaft 61. The rib 74 has a plurality of downwardly-projecting protrusions 74a formed at its several axial locations to drip lubricating oil to locations where the supply of lubricating oil tends to become particularly thin, thereby enhancing lubrication.

Hollow lubricating-oil passages 61a, 65a are formed around the axial centers of the main shaft 61 and counter shaft 65 respectively. Lubricating oil is ejected radially from oil holes formed at several locations of the lubricating-oil passages 61a, 65a. The lubricating oil lubricates the axial movement of the shifter gear that is spline-fitted to the main shaft 61 and the counter shaft 65, and is thrown upward by the rotation of the groups of transmission gears m1 through m6, n1 through n6 inside the transmission chamber. The lubricating oil thus thrown upward adheres onto the ceiling surface of the transmission chamber M, and is dripped onto the groups of transmission gears m1 through m6, n1 through n6, thereby lubricating the meshing engagement between the groups of transmission gears m1 through m6, n1 through n6.

The power unit case 11 according to the present invention is a structure with a reduced front-to-rear width, in which the crankshaft 10 and the counter shaft 65 are rotatably journaled while being sandwiched between substantially horizontal parting surfaces of the upper and lower unitary case halves, and the main shaft 61 is rotatably journaled above the space between the crankshaft 10 and the counter shaft 65 and at a position above and slightly in front of the counter shaft 65. As seen in the left view shown in FIG. 5, the main shaft 61 rotates clockwise (as indicated by an arrow in FIG. 5) as the rotation of the crankshaft 10 is transmitted to the main shaft 61 via the primary speed-reduction mechanism 63a, 63b, and the counter shaft 65 rotates counterclockwise (as indicated by an arrow in FIG. 5) due to the meshing engagement between the groups of transmission gears m1 to m6, n1 to n6.

In the inner surface of the transmission case 11m of the upper unitary case 11U (the ceiling surface of the transmission chamber M) in the power unit case according to the present invention, the rib 74 is formed so as to project downwardly while being oriented in the axial direction, at a position that is slightly displaced rearwardly from a location vertically above the main shaft 61. Accordingly, the lubricating oil thrown upward by the clockwise rotation of the transmission gears m1 to m6 journaled to the main shaft 61 is temporarily received by the rib 74, which is formed at the position that is displaced rearwardly from the location vertically above the main shaft 61. The lubricating oil is then dripped to the portions of the transmission gears m1 to m6 rotating downward (immediately before the meshing engagement between the respective transmission gears m1 to m6, n1 to n6 of the main shaft 61 and counter shaft 65). The lubricating oil is thus efficiently fed to meshing portions between the groups of transmission gears m1 to m6, n1 to n6, thus lubricating the meshing portions.

Further, of the first transmission gears m1, n1 as the combination of gears that provides the largest gear ratio, the first transmission gear m1 located on the upper side and journaled to the main shaft 61 is surrounded by the arcuate ceiling surface 73, and the right bearing portion 71 of the shift fork shaft 70 hangs downward above the first transmission gear n1 located on the lower side and journaled to the counter shaft 65. In the arcuate surface 71a of the right bearing portion 71, the lubricating projection 72 is formed so as to project downwardly.

Further, the second transmission gear m2 of the combination of the second transmission gears m2, n2 that provides the second largest gear ratio is similarly surrounded by the arcuate ceiling surface 73, and the left bearing portion 71 of the shift fork shaft 70 hangs downward above the second transmission gear n2 located on the lower side and journaled to the counter shaft 65. In the arcuate surface 71a of the left bearing portion 71, the lubricating projection 72 is formed so as to project downwardly.

The shift fork shaft 70 constitutes gear ratio selecting mechanism closest to both the groups of transmission gears m1 to m6, n1 to n6. Therefore, both the bearing portions 71 supporting the shift fork shaft 70 are respectively located near the first transmission gear n1 and the second transmission gear n2, and the lubricating protrusions 72 formed so as to project downwardly from the arcuate surfaces 71a of the bearing portions 71 are respectively located in close proximity to and above the first transmission gear n1 and the second transmission gear n2.

Accordingly, in particular, the lubricating oil that has been thrown upward by the rotation of the first transmission gear m1 and second transmission gear m2 journaled to the main shaft 61, and has adhered onto the arcuate ceiling surfaces 73, travels along the rear ceiling surfaces 73 and travels continuously to the front-half arcuate surfaces 71a of the bearing portions 71 to reach the lubricating projections 72. The lubricating oil is then dripped directly below from the lubricating projections 72 onto the first transmission gear n1 and the second transmission gear n2 (that are journaled to the counter shaft 65).

Further, the lubricating oil thrown upward by the rotation of the first transmission gear n1 and second transmission gear n2 adheres onto the rear-half arcuate surfaces 71a of the bearing portions 71 and travels along the rear-half arcuate surfaces 71a to be dripped directly below from the lubricating projections 72 onto the first transmission gear n1 and the second transmission gear n2.

As described above, in the power unit case according to the present invention, the main shaft 61 is arranged above the space between the crankshaft 10 and the counter shaft 65 that are arranged in the substantially horizontal parting surface between the upper and lower unitary case halves 11U, 11L, thereby achieving a reduction in front-to-rear width and hence a reduction in the size of the internal combustion engine E. In the upper unitary case 11U of the above-mentioned structure, the lubricating projections 72 are respectively provided above the first transmission gear n1 and the second transmission gear n2, and the lubricating oil that has traveled along the front and rear arcuate surfaces 71a of the lubricating projections 72 is dripped directly below to the upper portion of the first transmission gear n1 rotating toward the meshing portion of the first transmission gears m1, n1, and to the upper portion of the second transmission gear n2 rotating toward the meshing portion of the second transmission gears m2, n2. The lubricating oil is thus efficiently dripped for supply, in particular to the meshing portion of the first transmission gears m1, n1 that provide the largest gear ratio, and it is possible to positively lubricate the meshing portions of the first transmission gears m1, n1 and second transmission gears m2, n2 on which large loads act, thereby securing appropriate lubrication performance.

Further, the lubricating oil thrown up by the rotation of the group of transmission gears m1 to m6 journaled to the main shaft 61, is temporarily received by the rib 74. Then the lubricating oil is dripped to the upper portion of the group of transmission gears m1 to m6 rotating toward the meshing portion between the groups of transmission gears m1 through m6, n1 through n6 and supplied to this meshing portion. Further, the lubricating oil that has scattered and adhered onto the ceiling surface due to the rotations of the transmission gears m1, m2 and of the transmission gears n1, n2 journaled to the counter shaft 65 can be collected by the lubricating projections 72 for dripping onto the transmission gears n1, n2, thereby enabling efficient lubrication of both the transmission gear groups meshing with each other in multiple stages.

What is claimed is:

1. A power unit case for an internal combustion engine, said power unit case comprising:
    a crankcase for housing a crankshaft, and
    a transmission case for housing a transmission mechanism, said transmission mechanism comprising:
        a main shaft to which power is transmitted through meshing of a gear with the crankshaft,
        a counter shaft to which power is transmitted through mutual meshing of a group of transmission gears with the main shaft, and
        a gear-ratio selecting mechanism for selecting a combination of transmission gears for performing effective power transmission from among the group of transmission gears,
    wherein the main shaft is arranged above a space between the crankshaft and the counter shaft arranged at a position substantially horizontally behind the crankshaft;
    the gear-ratio selecting mechanism is arranged above the group of transmission gears on the counter shaft whose upper portion rotates toward a meshing portion of the group of transmission gears; and
    wherein the transmission case comprises a ceiling surface having a lubricating projection formed thereon and projecting downwardly above the transmission gears on the counter shaft, and at a location on a ceiling surface inside the transmission case where the gear-ratio selecting mechanism is supported, wherein
    the ceiling surface inside the transmission case where the gear-ratio selecting mechanism is supported is formed arcuate, and wherein
    the lubricating projection that projects downward is formed at a lowermost portion of the arcuate surface on a rear-half of the ceiling surface.

2. The power unit case for an internal combustion engine according to claim 1, wherein the lubricating projection is formed above a combination of transmission gears on the counter shaft which provides a large gear.

3. The power unit case for an internal combustion engine according to claim 1, wherein the transmission case further comprises a rib that is oriented in an axial direction and is formed so as to project downwardly at a location on the ceiling surface inside the transmission case which is displaced rearwardly from a position vertically above the main shaft.

4. The power unit case for an internal combustion engine according to claim 1, wherein the gear-ratio selecting mechanism is a shift fork shaft.

5. The power unit case for an internal combustion engine according to claim 2, wherein the transmission case further comprises a rib that is oriented in an axial direction and is formed so as to project downwardly, at a location on the ceiling surface inside the transmission case which is displaced rearwardly from a position vertically above the main shaft.

6. The power unit case for an internal combustion engine according to claim 1, wherein the horizontal disposition of the axes of rotation of crankshaft, the main shaft, and the counter shaft is such that they create an acute triangle when viewed in an end view.

7. A power unit, comprising:
    a power unit case comprising:
        a crankcase for housing a crankshaft, and
        a transmission case housing a transmission mechanism, said transmission mechanism comprising:
            a main shaft to which power is transmitted through meshing of a gear with the crankshaft,
            a counter shaft to which power is transmitted through mutual meshing of a group of transmission gears with gears of the main shaft, said counter shaft situated at a position behind the crankshaft, and
            a gear-ratio selecting mechanism for selecting a combination of transmission gears for performing effective power transmission from among the group of transmission gears,
        wherein, the main shaft is arranged above a space between the crankshaft and the counter shaft,
        the gear-ratio selecting mechanism is arranged above the group of transmission gears on the counter shaft whose upper portion rotates toward a meshing portion of the group of transmission gears; and
        wherein a downwardly-extending lubricating projection is formed on a ceiling surface inside the transmission case above the transmission gears of the counter shaft, wherein
        the ceiling surface inside the transmission case is formed arcuate, and
        the downwardly-extending lubricating projection is formed at a lowermost portion of the arcuate surface on a rear-half of the ceiling surface .

8. The power unit according to claim 7, wherein the lubricating projection is formed above a combination of transmission gears on the counter shaft which provides a large gear ratio.

9. The power unit according to claim 7, wherein the transmission case further comprises a rib that is oriented in an axial direction and is formed so as to project downwardly at a location on the ceiling surface inside the transmission case which is displaced rearwardly from a position vertically above the main shaft.

10. The power unit according to claim 7, wherein the gear-ratio selecting mechanism is a shift fork shaft.

11. The power unit according to claim 8, wherein the transmission case further comprises a rib that is oriented in an axial direction and is formed so as to project downwardly at a location on the ceiling surface inside the transmission case which is displaced rearwardly from a position vertically above the main shaft.

12. The power unit case for an internal combustion engine according to claim 1, wherein
    said lubricating projection is a first lubricating projection; and
    a second lubricating projection is formed on a ceiling surface inside the transmission case such that the first lubricating projection projects downwardly above the transmission gears on one side of the counter shaft, and the second lubricating projection projects downwardly above the transmission gears on an opposite side of the counter shaft from the first lubricating projection, and at a location on a ceiling surface inside the transmission case where the gear-ratio selecting mechanism is supported.

13. The power unit case for an internal combustion engine according to claim 12, wherein the first lubricating projection is formed above a combination of transmission gears on the counter shaft which provides a largest gear ratio and the second lubricating projection is formed above a combination of transmission gears on the counter shaft which provides a second largest gear ratio.

14. The power unit according to claim 7, wherein
said downwardly-extending lubricating projection is a first downwardly-extending lubricating projection; and
a second downwardly-extending lubricating projection is formed on a ceiling surface inside the transmission case such that the first downwardly-extending lubricating projection is formed above the transmission gears on one side of the counter shaft and the second downwardly-extending lubricating projection is formed above the transmission gears on an opposite side of the counter shaft from the first lubricating projection.

15. The power unit case for an internal combustion engine according to claim 14, wherein the first lubricating projection is formed above a combination of transmission gears on the counter shaft which provides a largest gear ratio and the second lubricating projection is formed above a combination of transmission gears on the counter shaft which provides a second largest gear ratio.

16. A power unit case for an internal combustion engine, said power unit case comprising:
a crankcase for housing a crankshaft, and
a transmission case for housing a transmission mechanism, said transmission mechanism comprising:
a main shaft to which power is transmitted through meshing of a gear with the crankshaft,
a counter shaft to which power is transmitted through mutual meshing of a group of transmission gears with the main shaft, and
a gear-ratio selecting mechanism for selecting a combination of transmission gears for performing effective power transmission from among the group of transmission gears,
wherein the main shaft is arranged above a space between the crankshaft and the counter shaft arranged at a position substantially horizontally behind the crankshaft;
the gear-ratio selecting mechanism is arranged above the group of transmission gears on the counter shaft whose upper portion rotates toward a meshing portion of the group of transmission gears; and
wherein the transmission case comprises a ceiling surface having a first lubricating projection and a second lubricating projection formed thereon such that the first lubricating projection projects downwardly above the transmission gears on one side of the counter shaft, and at a location on the ceiling surface inside the transmission case where the gear-ratio selecting mechanism is supported, and the second lubricating projection projects downwardly above the transmission gears on an opposite side of the counter shaft from the first lubricating projection, and at a location on a ceiling surface inside the transmission case where the gear-ratio selecting mechanism is supported.

17. The power unit case for an internal combustion engine according to claim 16, wherein the first lubricating projection is formed above a combination of transmission gears on the counter shaft which provides a largest gear ratio and the second lubricating projection is formed above a combination of transmission gears on the counter shaft which provides a second largest gear ratio.

* * * * *